US010855487B2

(12) United States Patent
Hashiura

(10) Patent No.: US 10,855,487 B2
(45) Date of Patent: Dec. 1, 2020

(54) NETWORK SYSTEM, SERVER, AND INFORMATION PROCESSING METHOD

(71) Applicant: SHARP KABUSHIKI KAISHA, Sakai (JP)

(72) Inventor: Masaki Hashiura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 19 days.

(21) Appl. No.: 16/478,689

(22) PCT Filed: Apr. 18, 2018

(86) PCT No.: PCT/JP2018/015954
§ 371 (c)(1),
(2) Date: Jul. 17, 2019

(87) PCT Pub. No.: WO2018/211901
PCT Pub. Date: Nov. 22, 2018

(65) Prior Publication Data
US 2019/0372795 A1    Dec. 5, 2019

(30) Foreign Application Priority Data
May 19, 2017    (JP) .................... 2017-099821

(51) Int. Cl.
*H04L 12/28*    (2006.01)
*H04L 29/08*    (2006.01)

(52) U.S. Cl.
CPC .......... *H04L 12/282* (2013.01); *H04L 12/283* (2013.01); *H04L 67/125* (2013.01); *H04L 67/18* (2013.01); *H04L 2012/285* (2013.01)

(58) Field of Classification Search
CPC ... H04L 12/282; H04L 12/283; H04L 67/125; H04L 67/18
See application file for complete search history.

(56) References Cited

U.S. PATENT DOCUMENTS

| | | | |
|---|---|---|---|
| 2013/0145004 A1* | 6/2013 | Kumhyr | G06F 8/65 709/223 |
| 2015/0142140 A1* | 5/2015 | Yamaguchi | G05B 15/02 700/50 |
| 2016/0340059 A1* | 11/2016 | Pettre | G05B 23/0283 |

FOREIGN PATENT DOCUMENTS

| | | |
|---|---|---|
| JP | 2001-054176 A | 2/2001 |
| JP | 2008-101880 A | 5/2008 |
| JP | 2010-206714 A | 9/2010 |
| JP | 2013-030004 A | 2/2013 |
| JP | 2015-038416 A | 2/2015 |

* cited by examiner

*Primary Examiner* — Minh Chau Nguyen
(74) *Attorney, Agent, or Firm* — ScienBiziP, P.C.

(57) ABSTRACT

Provided herein is a network system (1) that includes: an electric apparatus (300); and a server (100) that computes a predicted absence time period by using prediction data concerning a user of the electric apparatus (300), and that detects an absence time in which nobody is detected, the server (100) causing the electric apparatus (300) to perform an absence-time operation upon detecting a first absence time in a period outside of the predicted absence time period, and causing the electric apparatus (300) to perform the absence-time operation upon detecting a second absence time, shorter than the first absence time, in a period within the predicted absence time period.

8 Claims, 19 Drawing Sheets

FIG.2
(a)
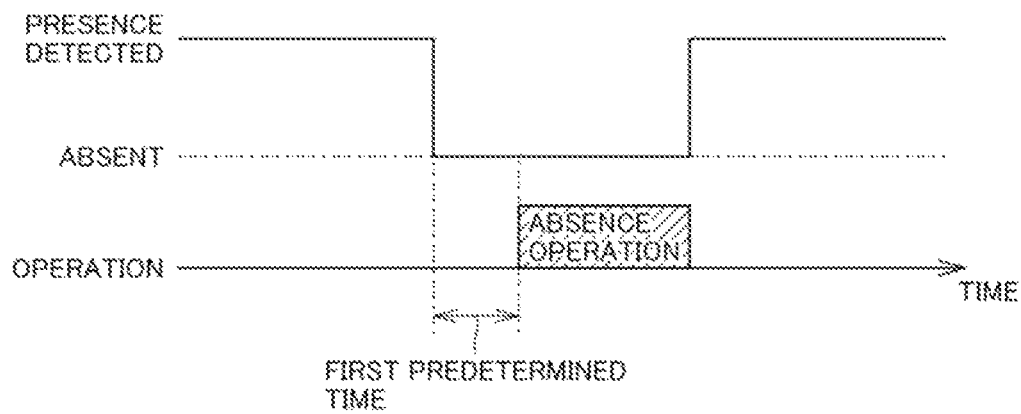
(b)
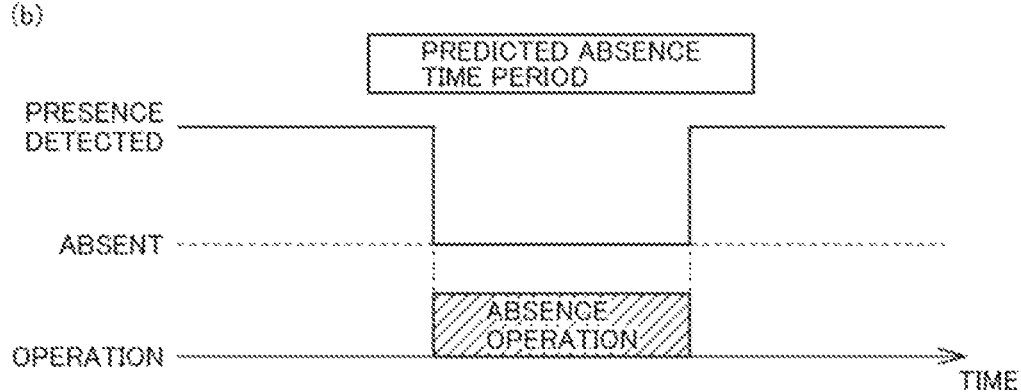

FIG.8

|  | ASSUMED OUTING | PREDICTED OUTING |
|---|---|---|
| DAY 1 | 9-10 | NONE |
| DAY 2 | 8-9 | NONE |
| DAY 3 | NONE | NONE |
| DAY 4 | 8-9, 10-11 | NONE |
| DAY 5 | NONE | 8-9, 9-10 |
| DAY 6 | 10-11 | 8-9, 9-10 |
| DAY 7 | 8-9 | 8-9, 9-10, 10-11 |
| DAY 8 | 10-11 | 8-9, 9-10, 10-11 |
| DAY 9 | 8-9 | 8-9, 10-11 |

FROM DAY 1 TO DAY 4, USER LEFT HOME BETWEEN 8 AND 9 AND BETWEEN 9 AND 10, THREE TIMES WITHIN 1 HOUR BEFORE OR AFTER 8 TO 9, AND FOUR TIMES WITHIN 1 HOUR BEFORE OR AFTER 9 TO 10.

FROM DAY 2 TO DAY 8, USER LEFT HOME SIX TIMES WITHIN 1 HOUR BEFORE OR AFTER 9 TO 10, BUT DID NOT LEAVE HOME BETWEEN 9 AND 10.

FIG.9
(a)
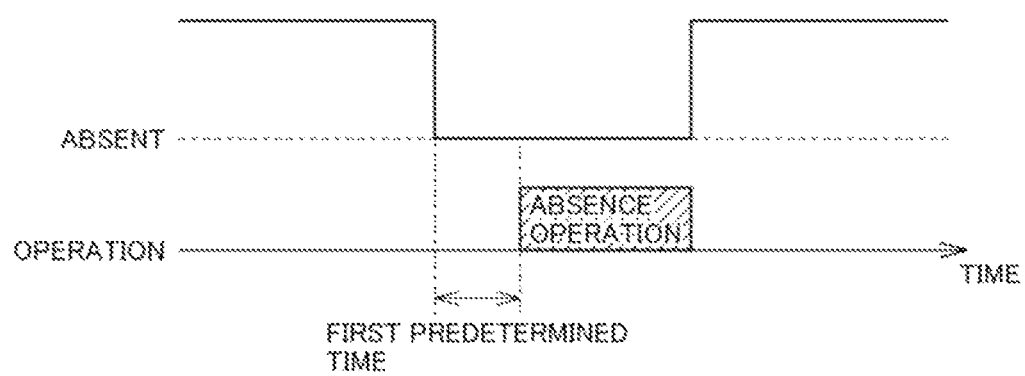
(b)
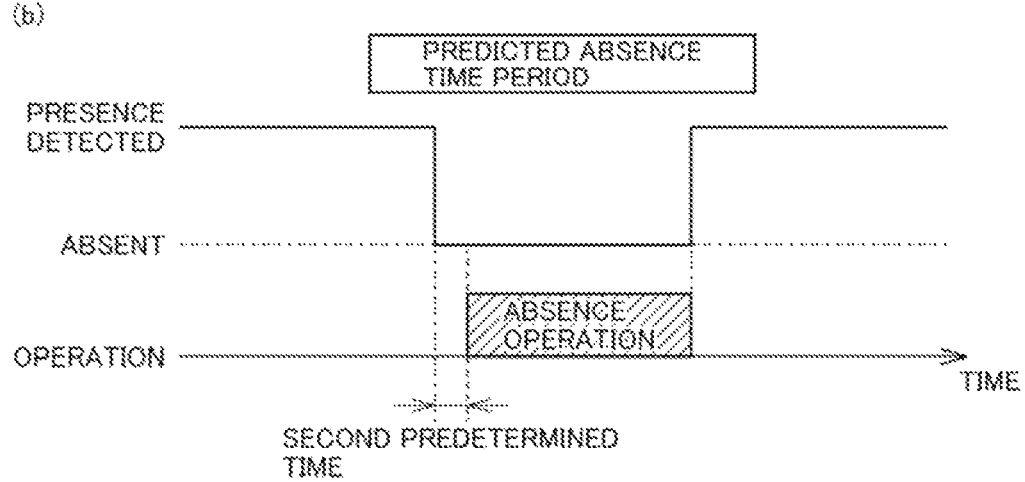

FIG.12
PERCENTAGE IS CALCULATED FROM SUM OF OPEN CIRCLES
AND OPEN SQUARES FROM EACH TIME ZONE

DAY 5:   HOURS 8 TO 9 = TWICE (50%),
         HOURS 9 TO 10 = ONCE (25%),
         HOURS 10 TO 11 = ONCE (25%)

DAY 6:   HOURS 8 TO 9 = THREE TIMES (60%),
         HOURS 9 TO 10 = ONCE (20%),
         HOURS 10 TO 11 = ONCE (20%)

DAY 7:   HOURS 8 TO 9 = THREE TIMES (50%),
         HOURS 9 TO 10 = ONCE (17%),
         HOURS 10 TO 11 = TWICE (33%)

DAY 8:   HOURS 8 TO 9 = FOUR TIMES (57%),
         HOURS 9 TO 10 = ONCE (14%),
         HOURS 10 TO 11 = TWICE (29%)

DAY 9:   HOURS 8 TO 9 = FOUR TIMES (57%),
         HOURS 10 TO 11 = THREE TIMES (43%)

FIG.13
PERCENTAGE IS CALCULATED FROM SUM OF OPEN CIRCLES
AND OPEN SQUARES FROM EACH TIME ZONE

DAY 5:   HOURS 8 TO 9 = TWICE/4 DAYS (50%),
         HOURS 9 TO 10 = ONCE/4 DAYS (25%),
         HOURS 10 TO 11 = ONCE/4 DAYS (25%)

DAY 6:   HOURS 8 TO 9 = THREE TIMES/5 DAYS (60%),
         HOURS 9 TO 10 = ONCE/5 DAYS (20%),
         HOURS 10 TO 11 = ONCE/5 DAYS (20%)

DAY 7:   HOURS 8 TO 9 = THREE TIMES/6 DAYS (50%),
         HOURS 9 TO 10 = ONCE/6 DAYS (17%),
         HOURS 10 TO 11 = TWICE/6 DAYS (33%)

DAY 8:   HOURS 8 TO 9 = FOUR TIMES/7 DAYS (57%),
         HOURS 9 TO 10 = ONCE/7 DAYS (14%),
         HOURS 10 TO 11 = TWICE/7 DAYS (29%)

DAY 9:   HOURS 8 TO 9 = FOUR TIMES/7 DAYS (57%),
         HOURS 10 TO 11 = THREE TIMES/7 DAYS (43%)

FIG.14

| | |
|---|---|
| UNPREDICTABLE | 20 MIN |
| 0% TO 24% | 15 MIN |
| 25% TO 49% | 10 MIN |
| 50% TO 74% | 5 MIN |
| 75% OR MORE | 0 MIN (IMMEDIATE) |

FIG.15
(a)
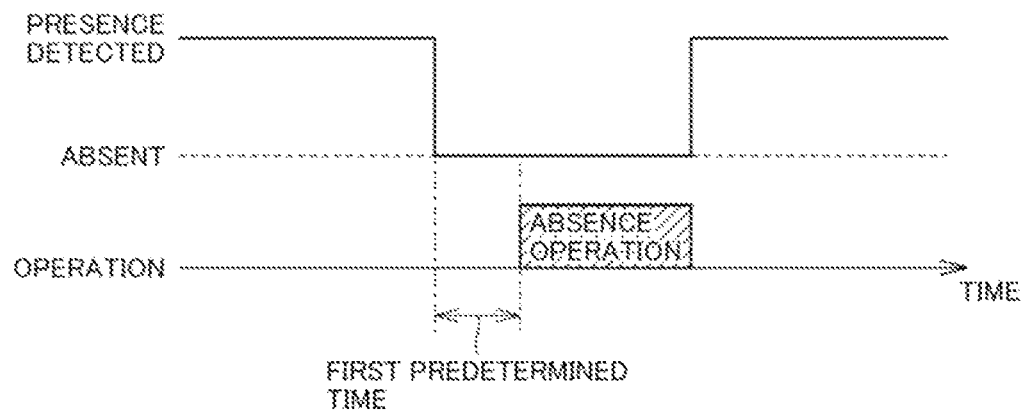
(b)
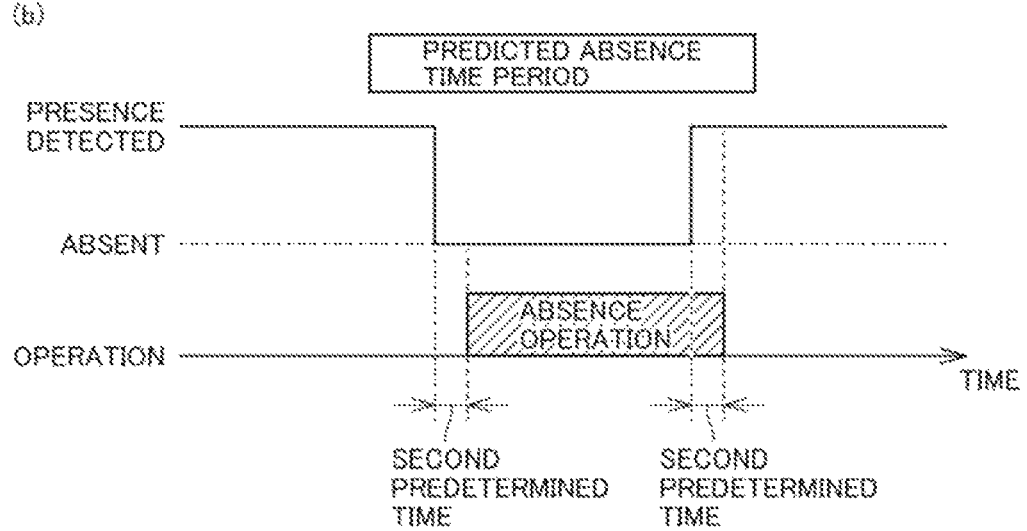

FIG.17
(a)
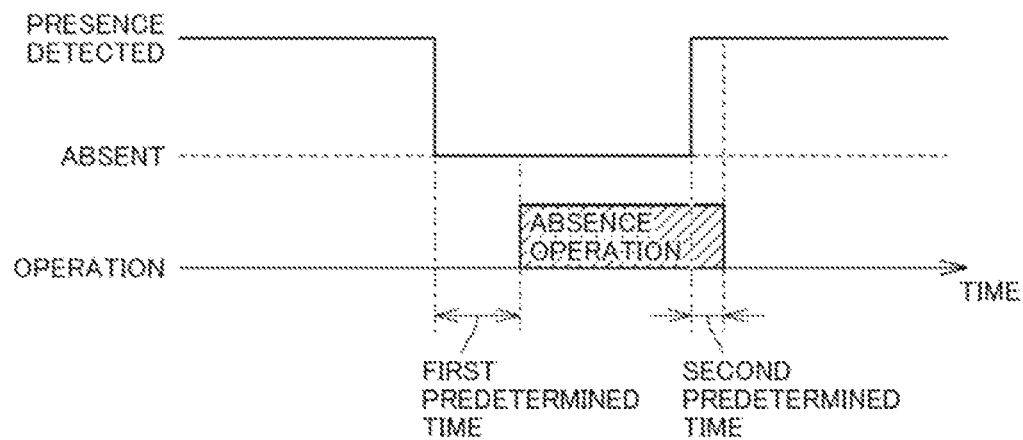
(b)
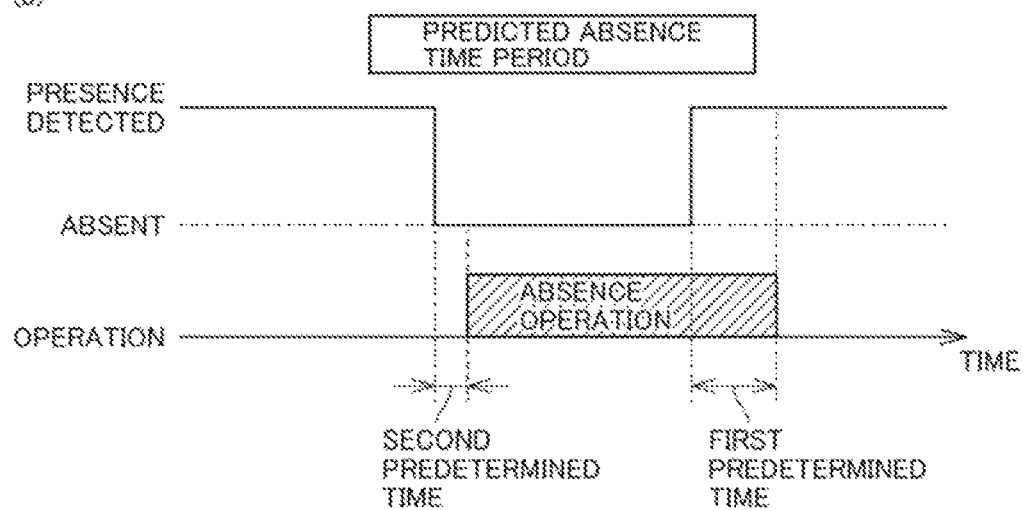

FIG.19
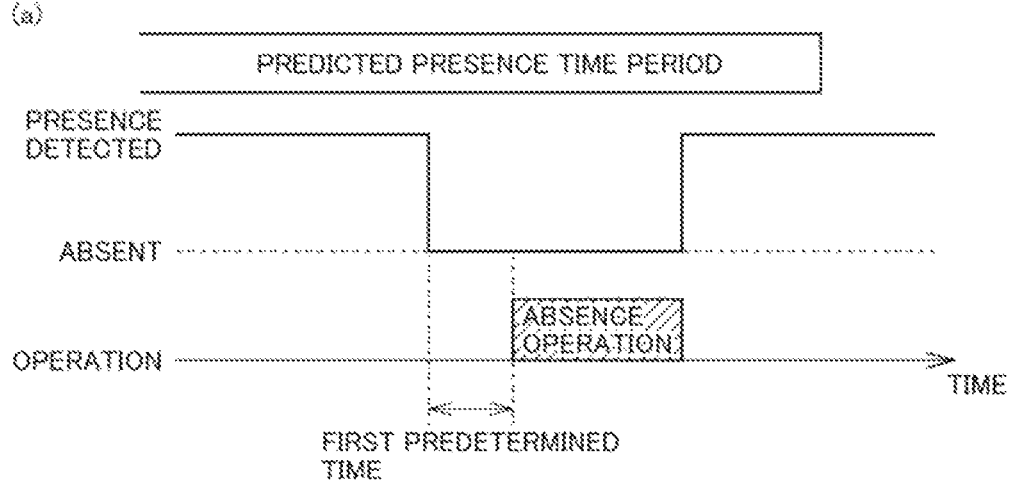
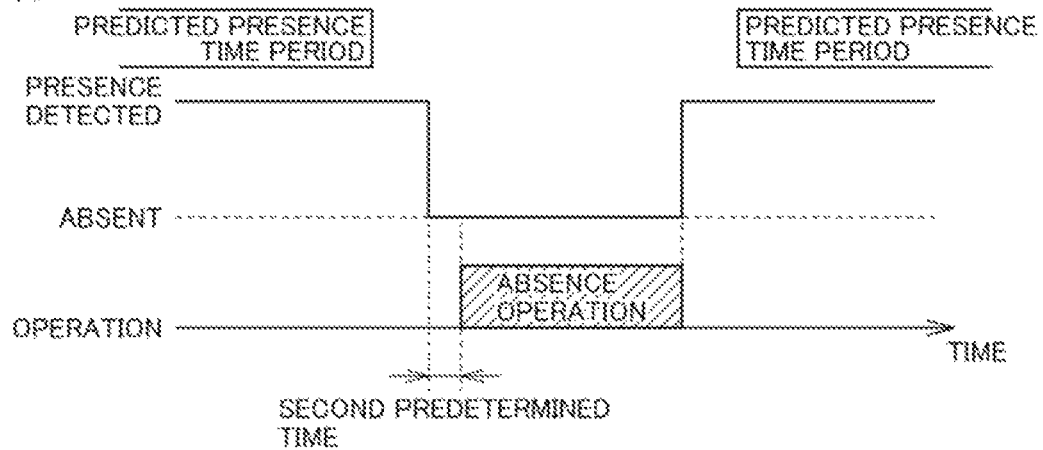

US 10,855,487 B2

NETWORK SYSTEM, SERVER, AND INFORMATION PROCESSING METHOD

TECHNICAL FIELD

The present invention relates to an air conditioner control technology, particularly a technology for enabling an operation performed in the absence of a user.

BACKGROUND ART

A technology is known that properly controls an air conditioner on the basis of whether a user is present or absent around an air conditioner. For example, JP-A-2001-54176 (PTL 1) discloses a power control system for home electric appliances. In the power control system for home electric appliances disclosed in PTL 1, a plurality of electric apparatuses, for example, such as an air conditioner and a heated toilet seat, are connected in parallel to an electrical line connected via a power control unit to a power line of a commercial AC power source (AC 100 V). Sensors, for example, such as a temperature sensor, a human sensor for detecting the presence or absence of a person, and a contact sensor are provided to detect usage of the electric apparatuses, and sensor information detected by these sensors is accumulated and stored in a memory device, along with time. From the stored information, a processor computes the usage and the consumed power of each electric apparatus, and predicts typical usage patterns. The power control unit then uses the results of prediction (predicted patterns) to control operations of the electric apparatuses.

CITATION LIST

Patent Literature

PTL 1: JP-A-2001-54176

SUMMARY OF INVENTION

Technical Problem

It is an object of the present invention to provide a technology for properly making a transition to an operation performed in the absence of a user.

Solution to Problem

According to an aspect of the present invention, there is provided a network system. The network system includes:
an electric apparatus; and
a server that computes a predicted absence time period by using prediction data concerning a user of the electric apparatus, and that detects an absence time in which nobody is detected, the server causing the electric apparatus to perform an absence-time operation upon detecting a first absence time in a period outside of the predicted absence time period, and causing the electric apparatus to perform the absence-time operation upon detecting a second absence time, shorter than the first absence time, in a period within the predicted absence time period.

Advantageous Effects of Invention

The present invention has provided a technology for properly making a transition to an operation performed in the absence of a user.

BRIEF DESCRIPTION OF DRAWINGS

FIG. 2 is a schematic diagram briefly representing operations of the network system 1 according to First Embodiment.

FIG. 8 is a schematic diagram representing predicted outing information 122 according to Third Embodiment.

FIG. 9 is a schematic diagram briefly representing operations of a network system 1 according to Fourth Embodiment.

FIG. 12 is a diagram representing a first probability-calculation method according to Fifth Embodiment.

FIG. 13 is a diagram representing a second probability-calculation method according to Fifth Embodiment.

FIG. 14 is a diagram representing the relationship between probability and second predetermined time period according to Fifth Embodiment.

FIG. 15 is a schematic diagram briefly representing a first operation of a network system 1 according to Sixth Embodiment.

FIG. 17 is a schematic diagram briefly representing a second operation of the network system 1 according to Sixth Embodiment.

FIG. 19 is a schematic diagram briefly representing operations of a network system 1 according to Seventh Embodiment.

DESCRIPTION OF EMBODIMENTS

Figure 1:
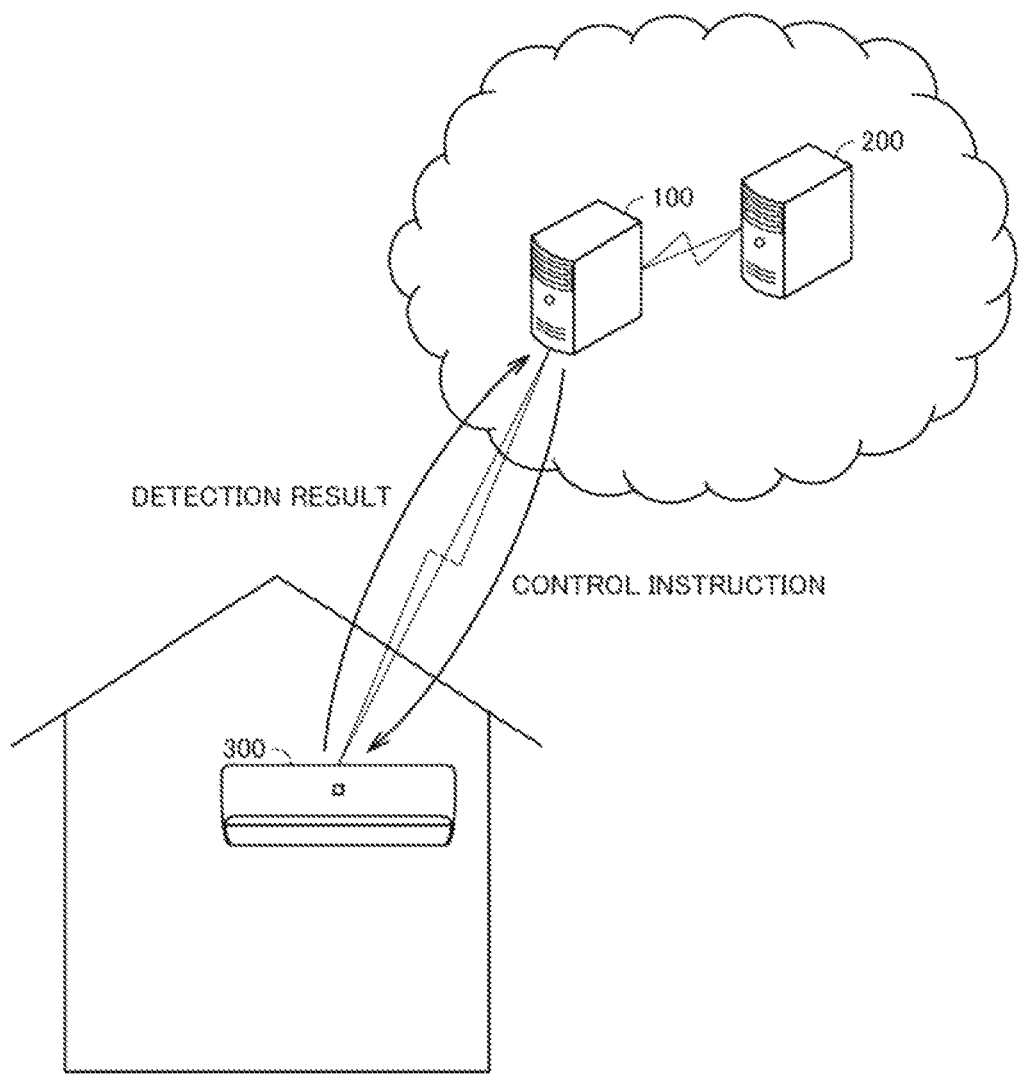
FIG. 1 is a diagram representing an overall configuration of a network system 1 according to First Embodiment.

Embodiments of the present invention are described below, with reference to the accompanying drawings. In the following descriptions, like elements are given like reference numerals. Such like elements will be referred to by the same names, and have the same functions. Accordingly, detailed descriptions of such elements will not be repeated.

First Embodiment

Overall Configuration of Network System 1

An overall configuration of a network system 1 according to the present embodiment is described below, with reference to FIG. 1. The main components of the network system 1 include a server 100 for controlling home appliances, and a plurality of air conditioners 300 that is communicable with the server 100 via, for example, a router and the Internet.

The network system 1 may also include another server, 200, that provides the server 100 with various types of information, including, for example, weather forecast, users' predicted absence information, and users' calendar information.

Operations of Network System 1: Brief Overview

The following briefly describes operations of the network system 1 according to the present invention, with references to FIGS. 1 and 2. In the present embodiment, the server 200 on the cloud accumulates predicted absence data of users, on a per-air conditioner 300 basis. When a user is predicted to be present around the air conditioner 300, or when a user is not predicted to be absent around the air conditioner 300, the server 100 causes the air conditioner 300 to start an absence operation (or an absence-time operation) in response to the incoming detection result from the air conditioner 300 that nobody is detected for at least a first predetermined time period (or a first absence time), as shown in FIG. 2(a). On the other hand, when a user is predicted to be absent around the air conditioner 300, or when a user is not predicted to be present around the air conditioner 300, the server 100 causes the air conditioner 300 to start the absence operation in response to the incoming detection result from the air conditioner 300 that nobody is present, as shown in FIG. 2(b).

The network system 1 is described below with regard to the specific configurations with which these functions are achieved.

Configuration of Server 100

Figure 3:
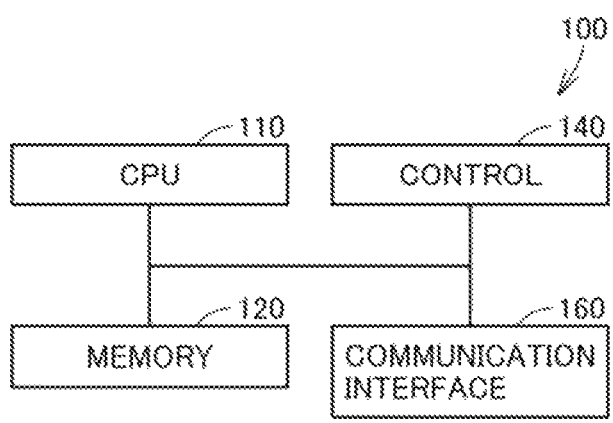
FIG. 3 is a block diagram representing a configuration of a server 100 according to First Embodiment.

The configuration of the server 100 constituting the network system 1 is described below, with reference to FIG. 3. The main components of the server 100 according to the present embodiment include a CPU (Central Processing Unit) 110, a memory 120, a control 140, and a communication interface 160.

The CPU 110 controls different parts of the server 100 by executing the programs stored in the memory 120 or in external storage media.

The memory 120 is implemented as various types of RAM (Random Access Memory) and ROM (Read Only Memory), for example. The memory 120 stores, for example, programs to be executed by the CPU 110, data generated by execution of programs by the CPU 110, and input data entered via the control 140. In the present embodiment, the server 100 is configured to obtain information regarding a time zone in which a user is expected to be absent (hereinafter, also referred to as "predicted absence time period"), on a per-air conditioner 300 or a per-user basis, from other servers or devices. However, the server 100 may be adapted so that the time zone in which a user is predicted to be absent may be created and stored in the CPU 110 and the memory 120 of the server 100, on a per-air conditioner 300 or a per-user basis, as will be described later.

The control 140 accepts control instructions from, for example, a service administrator, and passes the instructions to the CPU 110.

The communication interface 160 is implemented as a communication module such as wireless LAN or wired LAN. The communication interface 160 enables data exchange with other devices by means of wired communications or wireless communications. That is, the CPU 110 receives various kinds of information, for example, such as control log data, weather data, and user's predicted absence, from other devices such as the air conditioners 300 and the server 200, via the communication interface 160, and sends various kinds of information, for example, control instruction data, to these and other devices via the communication interface 160.

Information Process of Server 100

Figure 4:
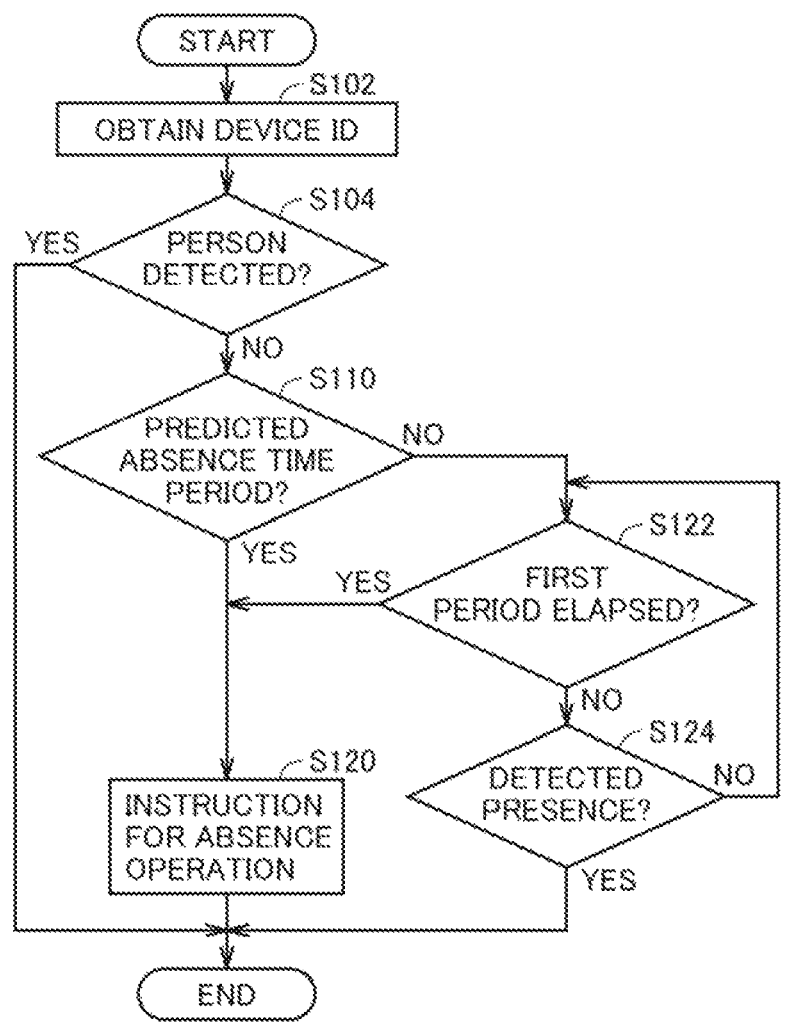
FIG. 4 is a flowchart representing an information process of the server 100 according to First Embodiment.

The following describes the information process of the server 100 according to the present embodiment, with reference to FIG. 4. The server 100 performs the following processes upon receiving the result of detection by a motion sensor from the air conditioner 300.

Upon receiving data from the air conditioner 300 via the communication interface 160, the CPU 110 obtains the device ID of the air conditioner 300 from the received data (step S102). The CPU 110 then determines whether the received data contain information of a person being detected around the air conditioner 300 (step S104). If a person has been detected around the air conditioner 300 (YES in step S104), the CPU 110 awaits the next data from the air conditioner 300 via the communication interface 160.

If a person has not been detected around the air conditioner 300 (NO in step S104), the CPU 110 refers to the predicted-absence-time-period data of a user corresponding to the air conditioner 300, and determines whether the user of the air conditioner 300 is expected to be currently absent (step S110). If the user is expected to be absent (YES in step S110), the CPU 110, via the communication interface 160, causes the air conditioner 300 to perform an absence operation (step S120). The CPU 110 then awaits the next data from the air conditioner 300 via the communication interface 160.

If the user is not expected to be absent (NO in step S110), the CPU 110 determines whether a first predetermined time period has elapsed from when a person was last detected by the air conditioner 300 (step S122). If it is determined that the first predetermined time period has elapsed (YES in step S122), the CPU 110 performs the process of step S120.

If it is determined that the first predetermined time period has not elapsed (NO in step S122), the CPU 110 inquires the air conditioner 300 whether a person has been detected (step S124). If it is determined that the air conditioner 300 has not detected a person (NO in step S124), the CPU 110 repeats the processes of step S122 and the subsequent steps. If it is determined that the air conditioner 300 has detected a person (YES in step S124), the CPU 110 awaits the next data from the air conditioner 300 via the communication interface 160.

Configuration of Air Conditioner 300

Figure 5:
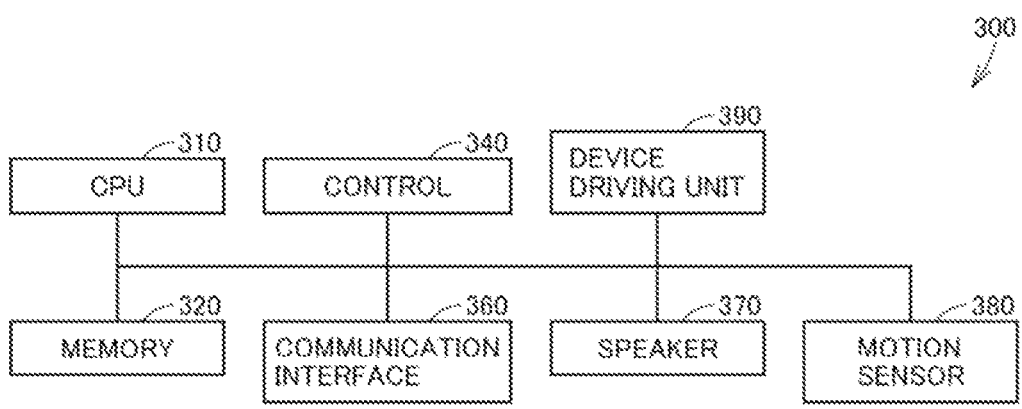
FIG. 5 is a block diagram representing a configuration of an air conditioner 300 according to First Embodiment.

The configuration of the air conditioner 300 is described below, with reference to FIG. 5. The main components of the air conditioner 300 include a CPU 310, a memory 320, a control 340, a communication interface 360, a speaker 370, a motion sensor 380, and a device driving unit 390.

The CPU 310 controls different parts of the air conditioner 300 by executing the programs stored in the memory 320 or in external storage media.

The memory 320 is implemented as various types of RAM and ROM, for example. The memory 320 stores, for example, programs to be executed by the CPU 310, and data generated by execution of programs by the CPU 310. Specifically, in the present embodiment, the memory 320 stores, for example, log data (e.g., a history of control input made through the control 340 and a remote controller), and control instructions received from the server 100 via a router and the Internet.

To describe more specifically, in the present embodiment, the memory 320 stores control information for user's absence period. For example, when the air conditioner 300 is running in heating mode, the CPU 310 lowers the control temperature by 1° C. when an instruction for user absence operation is received from the server 100 via the communication interface 360. When the air conditioner 300 is running in cooling mode, the CPU 310 increases the control temperature by 1° C. when an instruction for user absence operation is received from the server 100 via the communication interface 360.

In the present embodiment, the CPU 310 causes the device driving unit 390 to end the absence operation, and return to normal operation upon the motion sensor 380 detecting a person.

The communication interface 360 is implemented as a communication module such as wireless LAN or wired LAN. The communication interface 360 enables data exchange with other devices by means of wired communications or wireless communications. Specifically, the CPU 310, via the communication interface 360, uploads operation log data, person detection results, and other information to the server 100 and other devices, and receives various types of information, for example, an instruction to perform the absence operation, from the server 100 and other devices.

The motion sensor 380 detects a person around the air conditioner 300, and passes the detection result to the CPU 310.

The device driving unit 390 controls different parts (e.g., a motor and a heater) of the electric apparatus, using signals from the CPU 110.

The present embodiment uses prediction data predicting whether a user is present or absent around the air conditioner 300, specifically, in the room where the air conditioner 300 is installed. However, the prediction data may be one predicting whether a user is present or absent in the home where the air conditioner 300 is installed.

Second Embodiment

In First Embodiment, the air conditioner 300 ends the absence operation, and returns to normal operation upon the motion sensor 380 of the air conditioner 300 detecting a person. However, the absence operation of the air conditioner 300 may be ended by the server 100.

Figure 6:
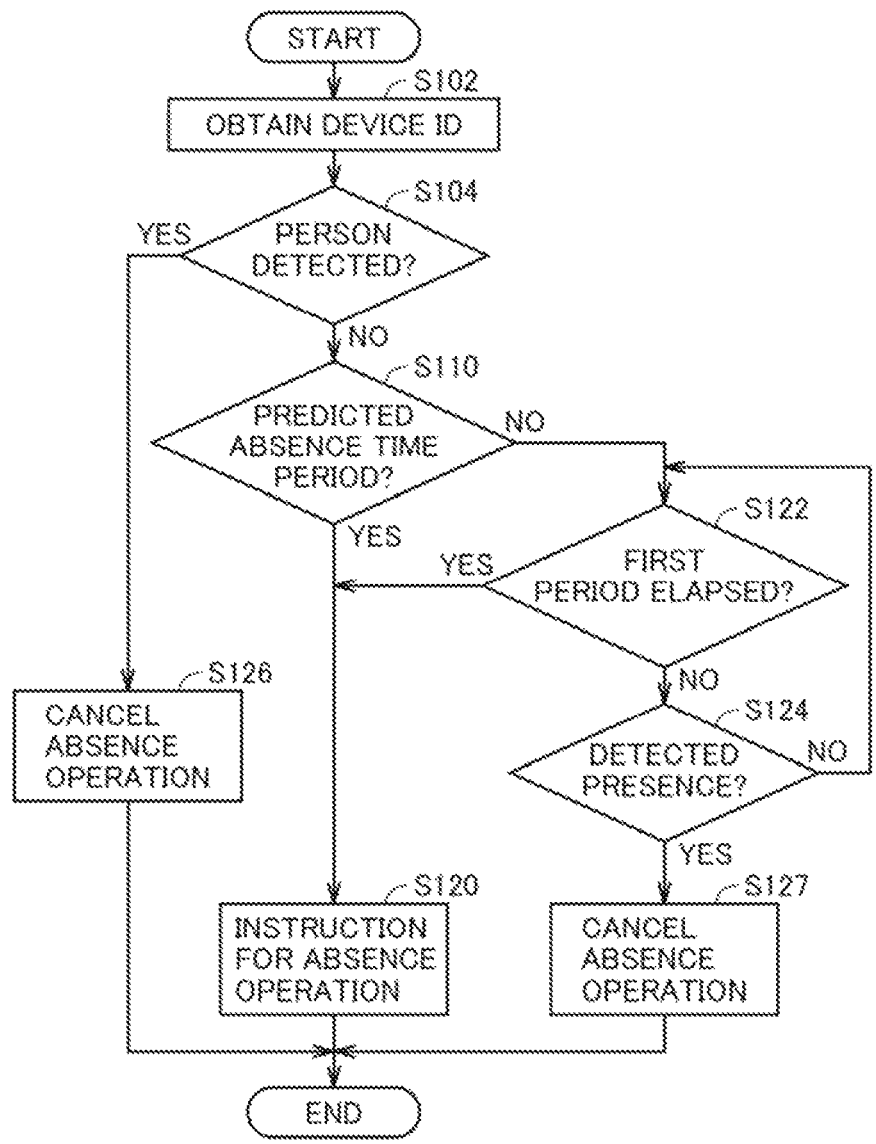
FIG. 6 is a flowchart representing an information process of a server 100 according to Second Embodiment.

Specifically, as shown in FIG. 6, the CPU 110 of the server 100 sends an instruction to end the absence operation to the air conditioner 300 via the communication interface 160 (steps S126 and S127) when a person was detected around the air conditioner 300 (YES in step S104) and when the air conditioner 300 has detected a person (YES in step S124).

Third Embodiment

In First and Second Embodiments, the server 100 obtains the predicted absence information of the user from the server 200. However, the server 100 may create predicted absence information by using data from the air conditioner 300.

Specifically, in the present embodiment, the air conditioner 300 regularly detects whether a user is present nearby, and sends the detection results to the server 100. The air conditioner 300 also sends the server 100 information regarding an instruction received from a user wanting to manually start the absence operation (setting of outing mode).

Figure 7:
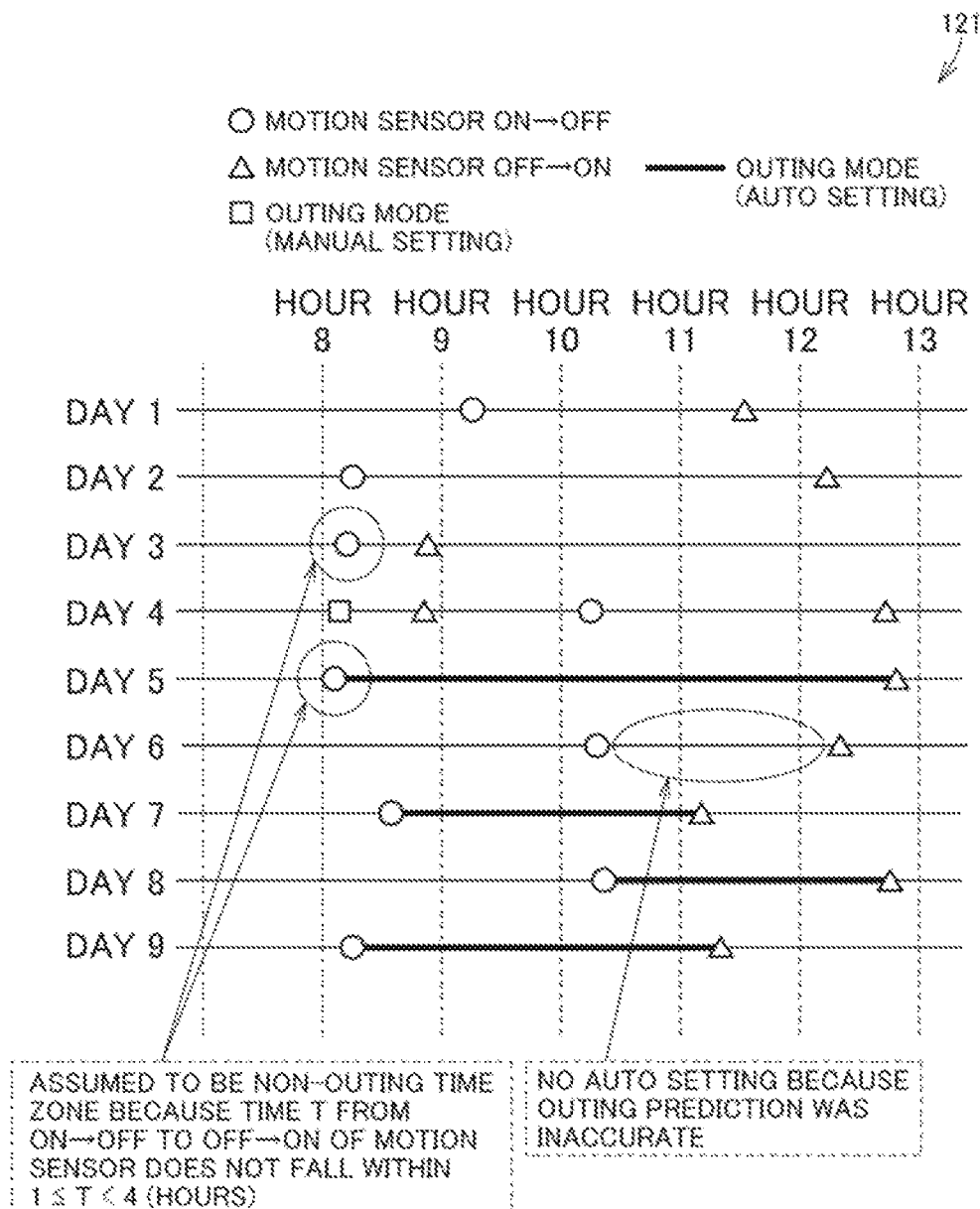
FIG. 7 is a schematic diagram representing outing information 121 according to Third Embodiment.

By using the detection results and the information regarding setting of outing mode from the air conditioner 300, the CPU 110 of the server 100 creates outing information 121 (FIG. 7), on a per-air conditioner 300 basis, and stores the information in the memory 120.

By using the outing information 121 created on a per-air conditioner 300 basis, the CPU 110 predicts time zones in which the user is expected to be absent, on a per-air conditioner 300 basis. The CPU 110 stores the predicted outing information 122 on a per-user basis, as shown in FIG. 8.

To describe more specifically, in the present embodiment, the CPU 110, on a per-user basis, determines time zones in which the user is expected to be absent, using a history of user detection results from the previous week, and a setting history of outing mode set by the user in the same time period. For example, in the CPU 110, time zones satisfying the following two conditions are determined as time zones in which the user is expected to be absent. In the following, a time period from the motion sensor switching OFF to the motion sensor switching ON again after at least 1 hour to less than 4 hours will be referred to as "outing time zone".

(1) A time zone belonged to the outing time zone in at least one of the days of the previous week.

(2) A time zone belonged to the outing time zone±1 hour in at least 3 days of the previous week.

The CPU 110 may make the absence prediction separately for weekdays and holidays, on a per-user basis.

The predicted absence time zone set by the CPU 110 of the server 100 on a per-air conditioner 300 basis in the manner described above may be used in step S110.

Fourth Embodiment

In First to Third Embodiments, the operation is immediately switched to absence mode when nobody is detected in the predicted absence time period. However, a short standby time may be provided even in the case where nobody is detected in the predicted absence time period.

Specifically, referring to FIG. 9, when a user is not predicted to be absent around the air conditioner 300, the server 100, as shown in FIG. 9(a), causes the air conditioner 300 to perform the absence operation when nobody is detected for at least a first predetermined time period, using the result of detection from the air conditioner 300. On the other hand, when a user is predicted to be absent around the air conditioner 300, the server 100, as shown in FIG. 9(b), causes the air conditioner 300 to perform the absence operation when nobody is detected for at least a second predetermined time period (also referred to as "second absence time"), using the result of detection from the air conditioner 300. Preferably, the second predetermined time period is shorter than the first predetermined time period.

Figure 10:
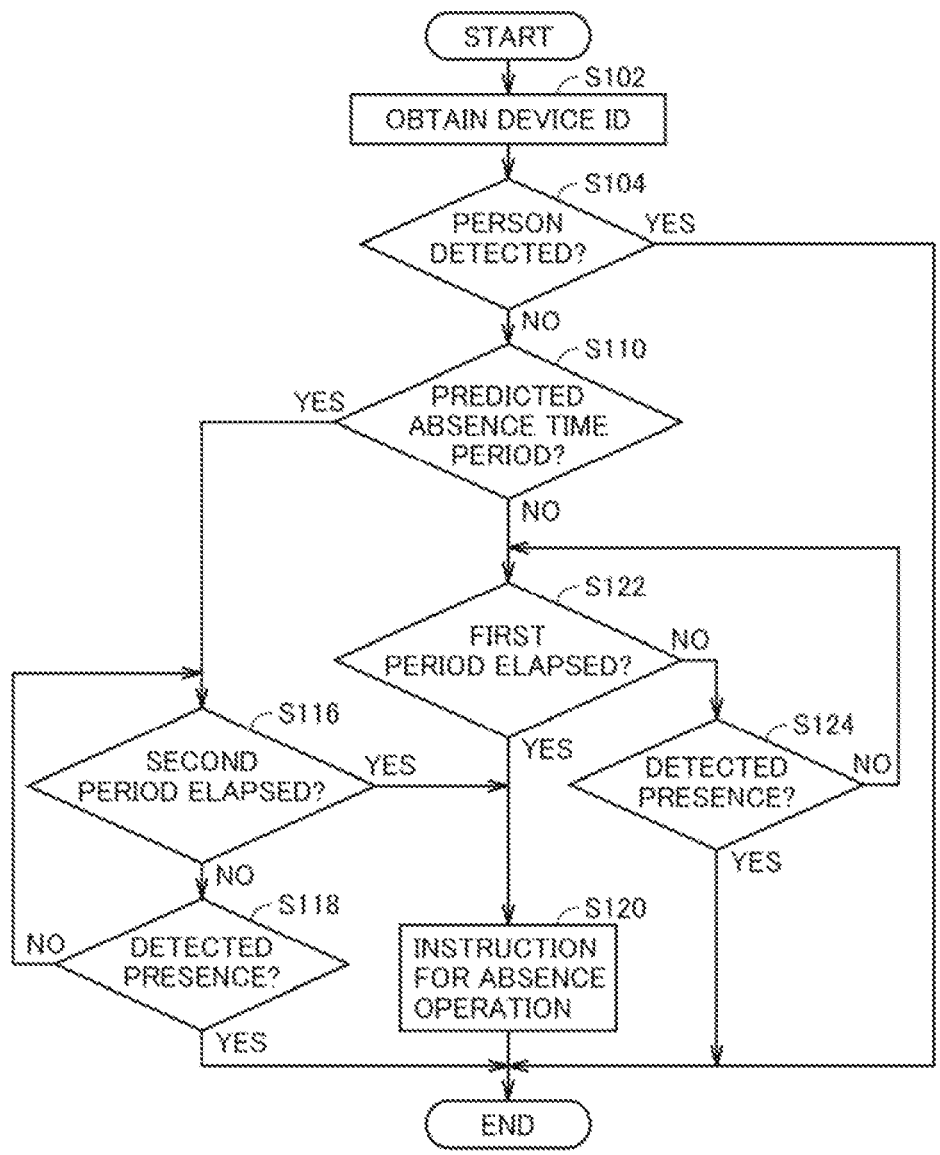
FIG. 10 is a flowchart representing an information process of the server 100 according to Fourth Embodiment.

The following describes the information process of the server 100 according to the present embodiment, with reference to FIG. 10. The server 100 performs the following processes upon receiving the result of detection by the motion sensor from the air conditioner 300.

Upon receiving data from the air conditioner 300 via the communication interface 160, the CPU 110 obtains the device ID of the air conditioner 300 from the received data (step S102). The CPU 110 then determines from the received data whether a person has been detected around the air conditioner 300 (step S104). If a person has been detected around the air conditioner 300 (YES in step S104), the CPU 110 awaits the next data from the air conditioner 300 via the communication interface 160.

If a person has not been detected around the air conditioner 300 (NO in step S104), the CPU 110 refers to the predicted-absence-time-period data of a user corresponding to the air conditioner 300, and determines whether the user of the air conditioner 300 is expected to be absent (step S110).

If the user is expected to be absent (YES in step S110), the CPU 110 determines whether the second predetermined time period has elapsed from when a person was last detected by the air conditioner 300 (step S116). The CPU 110 performs the process of step S120 if it is determined that the second predetermined time period has elapsed (YES in step S116).

If it is determined that the second predetermined time period has not elapsed (NO in step S116), the CPU 110 inquires the air conditioner 300 whether a person has been detected (step S118). The CPU 110 repeats the sequence from step S116 if nobody has been detected by the air conditioner 300 (NO in step S118). If it is determined that the air conditioner 300 has detected a person (YES in step S118), the CPU 110 awaits the next data from the air conditioner 300 via the communication interface 160.

When the user is not expected to be absent (NO in step S110), the CPU 110 determines whether the first predetermined time period has elapsed from when a person was last detected by the air conditioner 300 (step S122). The CPU 110 performs the process of step S120 if it is determined that the first predetermined time period has elapsed (YES in step S122).

If it is determined that the first predetermined time period has not elapsed (NO in step S122), the CPU 110 inquires the air conditioner 300 whether a person has been detected (step S124). The CPU 110 repeats the sequence from step S122 if nobody has been detected by the air conditioner 300 (NO in step S124). If it is determined that the air conditioner 300 has detected a person (YES in step S124), the CPU 110 awaits the next data from the air conditioner 300 via the communication interface 160.

Fifth Embodiment

In the present embodiment, the standby time in the absence of a person in the predicted absence time period may vary with the possibility of user absence.

Figure 11:
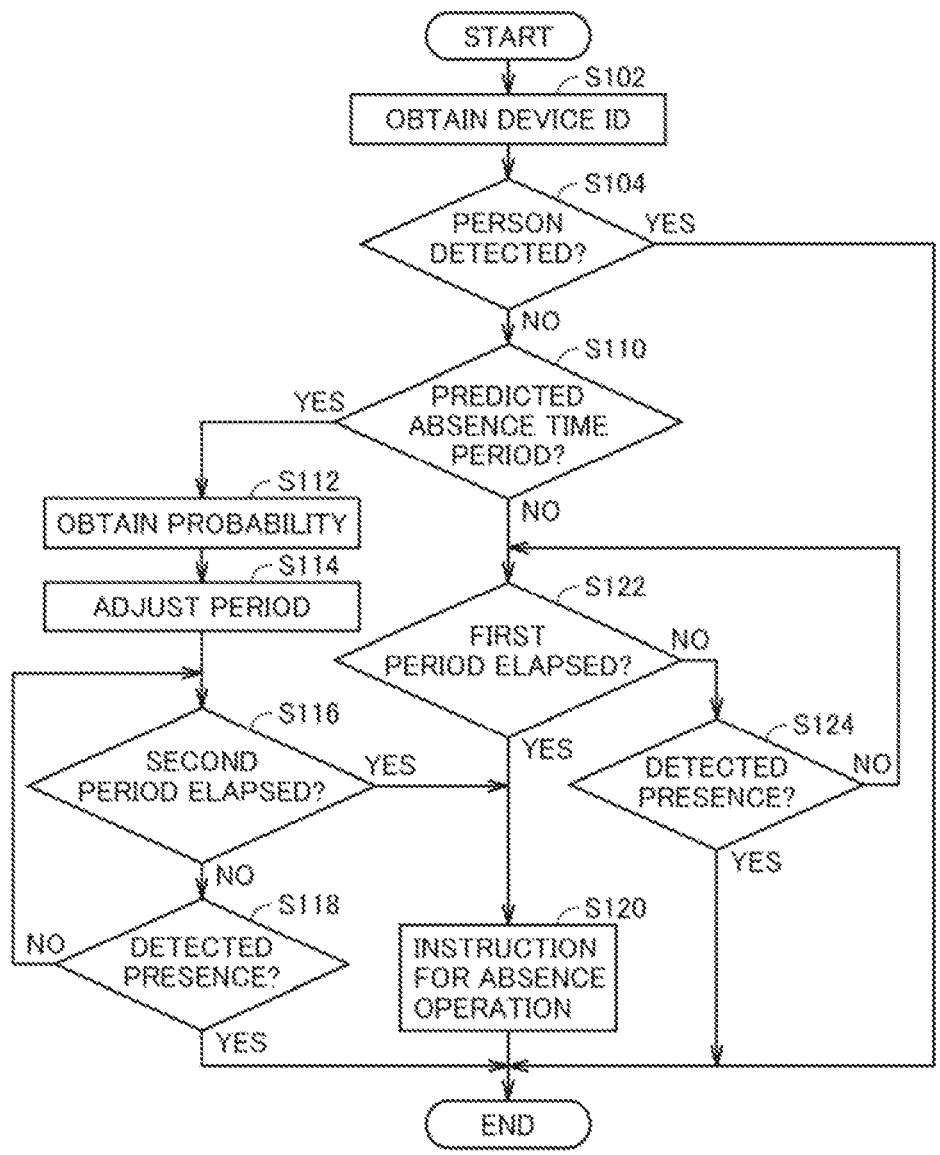
FIG. 11 is a flowchart representing an information process of the server 100 according to Fifth Embodiment.

The following describes the information process of the server 100 according to the present embodiment, with reference to FIG. 11. The server 100 performs the following processes upon receiving the result of detection by the motion sensor from the air conditioner 300.

Upon receiving data from the air conditioner 300 via the communication interface 160, the CPU 110 obtains the device ID of the air conditioner 300 from the received data (step S102). The CPU 110 then determines from the received data whether a person has been detected around the air conditioner 300 (step S104). If a person has been detected around the air conditioner 300 (YES in step S104), the CPU 110 awaits the next data from the air conditioner 300 via the communication interface 160.

If a person has not been detected around the air conditioner 300 (NO in step S104), the CPU 110 refers to the predicted-absence-time-period data of a user corresponding to the air conditioner 300, and determines whether the user of the air conditioner 300 is expected to be absent (step S110).

If it is determined that the user is expected to be absent (YES in step S110), the CPU 110 calculates the probability of user absence (step S112). The method for calculation of probabilities will be described later. The CPU 110 then determines the second predetermined time period, using the probability (step S114). The method for determining the second predetermined time period will be described later.

It is determined whether the second predetermined time period has elapsed from when a person was last detected by the air conditioner 300 (step S116). The CPU 110 performs the process of step S120 if it is determined that the second predetermined time period has elapsed (YES in step S116).

If it is determined that the second predetermined time period has not elapsed (NO in step S116), the CPU 110 inquires the air conditioner 300 whether a person has been detected (step S118). The CPU 110 repeats the sequence from step S116 if nobody has been detected by the air conditioner 300 (NO in step S118). If it is determined that a person has been detected by the air conditioner 300 (YES in step S118), the CPU 110 awaits the next data from the air conditioner 300 via the communication interface 160.

The sequence of when the user is not predicted to be absent (NO in step S110) is the same as in Fourth Embodiment, and will not be described again.

The following describes how the probability of user absence is calculated. As shown in FIG. 12, the CPU 110 calculates, on a per-air conditioner 300 basis, the probability of user absence per time zone by using a log of the detected presence and absence of a person from the previous week (e.g., the log data shown in FIG. 7). For example, when the user was absent twice for hours 8 to 9, once for hours 9 to 10, and once for hours 10 to 11 in the last four days from a given date, the probability of absence is calculated to be 50% (2/(2+1+1)) for hours 8 to 9, 25% (1/(2+1+1)) for hours 9 to 10, and 25% (1/(2+1+1)) for hours 10 to 11. Similarly, when the user was absent three times for hours 8 to 9, once for hours 9 to 10, and once for hours 10 to 11 in the last five days from a given date, the probability of absence is calculated to be 60% (3/(3+1+1)) for hours 8 to 9, 20% (1/(3+1+1)) for hours 9 to 10, and 20% (1/(3+1+1)) for hours 10 to 11. Similarly, when the user was absent three times for hours 8 to 9, once for hours 9 to 10, and twice for hours 10 to 11 in the last six days from a given date, the probability of absence is calculated to be 50% (3/(3+1+2)) for hours 8 to 9, 17% (1/(3+1+2)) for hours 9 to 10, and 33% (2/(3+1+2)) for hours 10 to 11. In this manner, the CPU 110 is able to determine the probability of absence in step S112, on a per-air conditioner 300 basis.

Alternatively, as shown in FIG. 13, the CPU 110, on a per-air conditioner 300 basis, calculates the probability of user absence per time zone, using a log of detection results from the previous week. For example, when the user was absent between hour 8 and hour 9 in two of the last four days from a given date, and was absent between hour 9 and hour 10 in one of the four days, and between hour 10 and hour 11 in one of the four days in this 4-day period, the probability of absence is calculated to be 50% (2/4 days) for hours 8 to 9, 25% (1/4 days) for hours 9 to 10, and 25% (1/4 days) for hours 10 to 11. Similarly, when the user was absent between hour 8 and hour 9 in three of the last five days from a given date, and was absent between hour 9 and hour 10 in one of the five days, and between hour 10 and hour 11 in one of the five days in this 5-day period, the probability of absence is calculated to be 60% (3/5 days) for hours 8 to 9, 20% (1/5 days) for hours 9 to 10, and 20% (1/5 days) for hours 10 to 11. Similarly, when the user was absent between hour 8 and hour 9 in three of the last six days from a given date, and was absent between hour 9 and hour 10 in one of the six days, and between hour 10 and hour 11 in two of the six days in this 6-day period, the probability of absence is calculated to be 50% (3/6 days) for hours 8 to 9, 17% (1/6 days) for hours 9 to 10, and 33% (2/6 days) for hours 10 to 11. In this manner, the CPU 110 is able to determine the probability of absence in step S112, on a per-air conditioner 300 basis.

The second predetermined time period is decided in the manner described below. As shown in FIG. 14, the memory 120 of the server 100 stores the absence probabilities and corresponding second predetermined time periods, specifically, standby times for determining the absence. In this way, the CPU 110, in step S114, is able to decide the second predetermined time period corresponding to the probability of absence, on a per-air conditioner 300 basis.

Sixth Embodiment

In First to Fifth Embodiments, the operation returns to normal mode as soon as a person is detected during the absence operation. In the present embodiment, the operation returns to normal mode after a predetermined standby time when a person is detected during the absence operation in the predicted absence time period.

Specifically, as shown in FIG. 15, when a user is not expected to be absent around the air conditioner 300, the server 100 causes the air conditioner 300 to perform the absence operation upon determining that nobody is detected for at least a first predetermined time period, using the result of detection from the air conditioner 300, as shown in FIG. 15(*a*). The absence operation ends, and the operation returns to normal mode when a person is detected during the absence operation. When a user is expected to be absent around the air conditioner 300, the server 100 causes the air conditioner 300 to perform the absence operation upon determining that nobody is detected for at least a second predetermined time period, using the result of detection from the air conditioner 300, as shown in FIG. 15(*b*). The absence operation ends, and the operation returns to normal mode when a person is detected during the absence operation and remains detected for the second predetermined time period.

Figure 16:
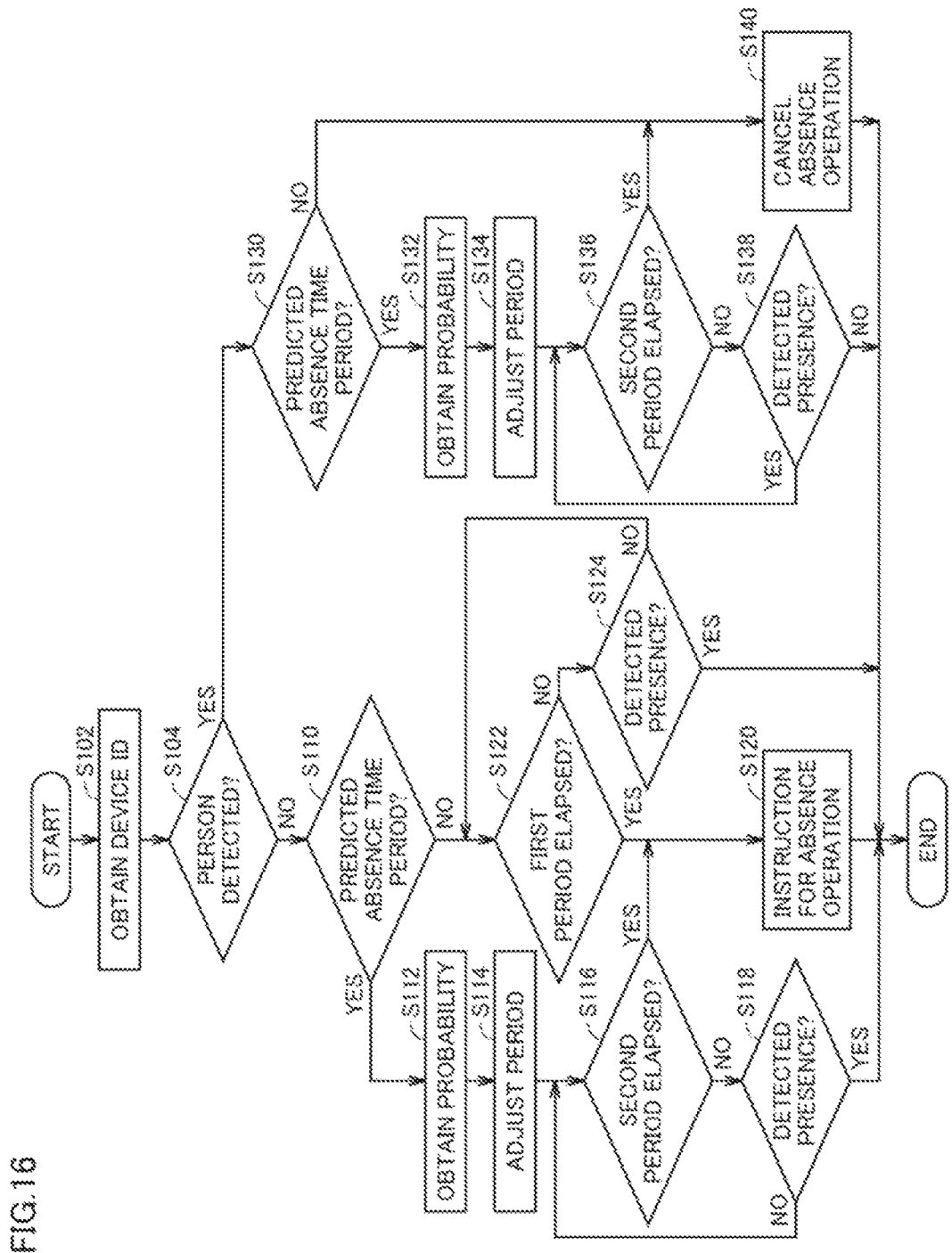
FIG. 16 is a flowchart representing a first information process of a server 100 according to Sixth Embodiment.

The following describes the information process of the server 100 according to the present embodiment, with reference to FIG. 16. The server 100 performs the following processes upon receiving the result of detection by the motion sensor from the air conditioner 300.

Upon receiving data from the air conditioner 300 via the communication interface 160, the CPU 110 obtains the device ID of the air conditioner 300 from the received data (step S102). The CPU 110 then determines from the received data whether a person has been detected around the air conditioner 300 (step S104). The CPU 110 performs the processes of step S110 and subsequent steps if a person has not been detected around the air conditioner 300 (NO in step S104). The processes of step S110 and subsequent steps are the same as in Fifth Embodiment, and will not be described again.

If a person has been detected around the air conditioner 300 (YES in step S104), the CPU 110 refers to the predicted-absence-time-period data of a user corresponding to the air conditioner 300, and determines whether the user of the air conditioner 300 is expected to be absent (step S130).

If the user is expected to be absent (YES in step S130), the CPU 110 calculates the probability of user absence (step S132). The CPU 110 then decides the second predetermined time period using the probability (step S134). In step S136, the CPU 110 determines whether the second predetermined time period has elapsed from when a person was last detected by the air conditioner 300 (step S136). The CPU 110 performs the process of step S140 if the second predetermined time period has elapsed (YES in step S136).

If it is determined that the second predetermined time period has not elapsed (NO in step S136), the CPU 110 inquires the air conditioner 300 whether a person has been detected (step S138). The CPU 110 repeats the sequence from step S136 if a person has been detected by the air conditioner 300 (YES in step S138). If a person has not been detected by the air conditioner 300 (NO in step S138), the CPU 110 awaits the next data from the air conditioner 300 via the communication interface 160.

When the user is not expected to be absent (NO in step S130), the CPU 110 causes the air conditioner 300 to end the absence operation, via the communication interface 160 (step S140). The CPU 110 then awaits the next data from the air conditioner 300 via the communication interface 160.

The absence operation may end, and the operation may return to normal mode when a person is detected during the absence operation and remains detected for at least the second predetermined time period, even when the user is not expected to be absent around the air conditioner 300 as in FIG. 17(*a*). The absence operation may end, and the operation may return to normal mode when a person is detected during the absence operation and remains detected for the first predetermined time period, even when the user is expected to be absent around the air conditioner 300 as in FIG. 17(*b*).

Figure 18:
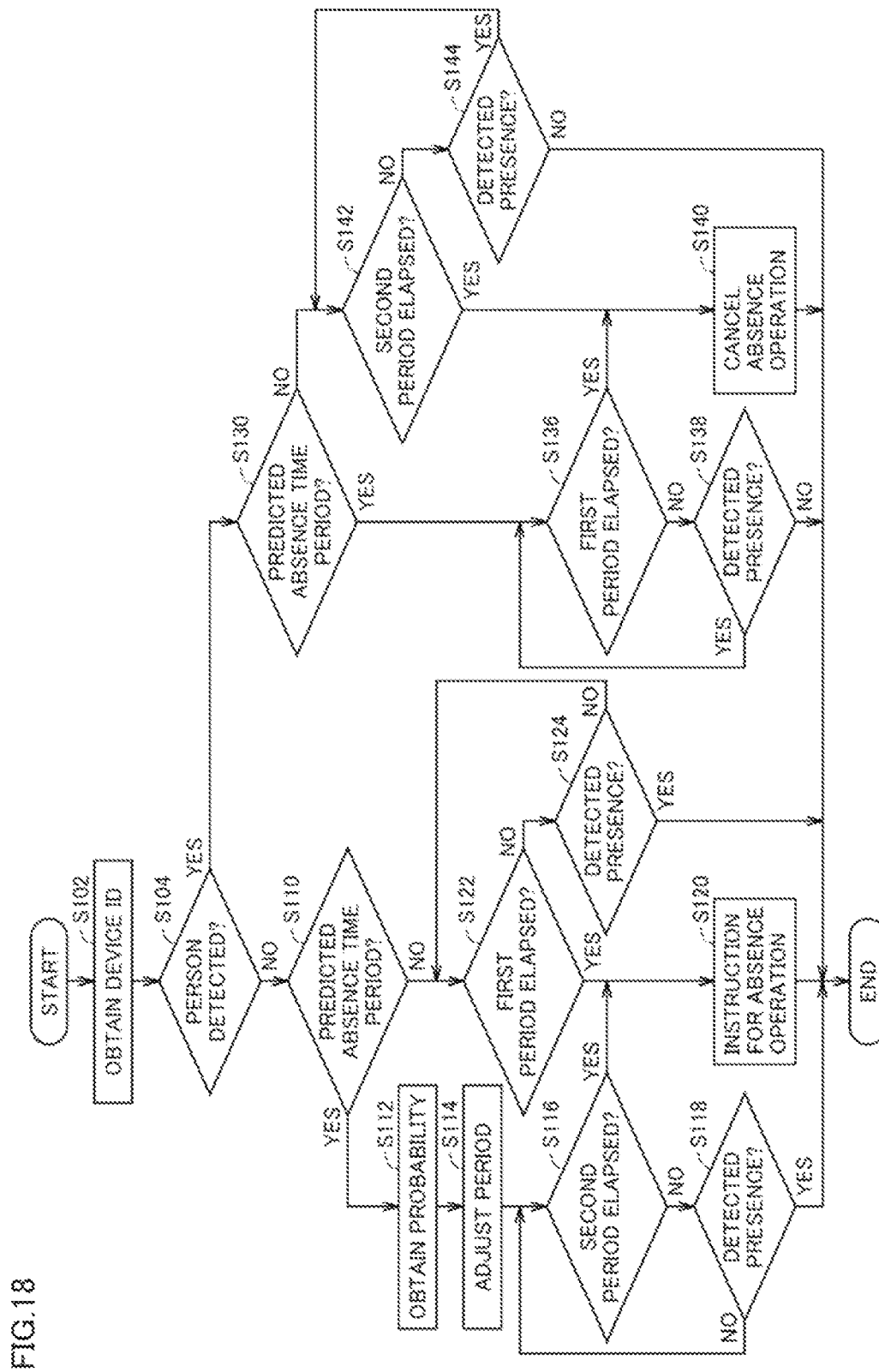
FIG. 18 is a flowchart representing a second information process of the server 100 according to Sixth Embodiment.

That is, as shown in FIG. 18, when the user is expected to be absent (YES in step S130), the CPU 110 determines whether the first predetermined time period has elapsed from when a person was last detected by the air conditioner 300 (step S136). The CPU 110 performs the process of step S140 if it is determined that the first predetermined time period has elapsed (YES in step S136).

If it is determined that the first predetermined time period has not elapsed (NO in step S136), the CPU 110 inquires the air conditioner 300 whether a person has been detected (step S138). The CPU 110 repeats the sequence from step S136 if a person has been detected by the air conditioner 300 (YES in step S138). If a person has not been detected by the air conditioner 300 (NO in step S138), the CPU 110 awaits the next data from the air conditioner 300 via the communication interface 160.

When the user is not expected to be absent (NO in step S130), the CPU 110 determines whether the second predetermined time period, shorter than the first predetermined time period, has elapsed from when the air conditioner 300 has detected a person (step S142). If it is determined that the second predetermined time period has elapsed (YES in step S142), the CPU 110 causes the air conditioner 300 to end the absence operation, via the communication interface 160 (step S140). The CPU 110 then awaits the next data from the air conditioner 300 via the communication interface 160.

If it is determined that the second predetermined time period has not elapsed (NO in step S142), the CPU 110 inquires the air conditioner 300 whether a person has been detected (step S144). The CPU 110 repeats the processes of step S142 and subsequent steps if a person has been detected by the air conditioner 300 (YES in step S144). If a person has not been detected by the air conditioner 300 (NO in step S144), the CPU 110 awaits the next data from the air conditioner 300 via the communication interface 160.

Seventh Embodiment

In First to Sixth Embodiments, the absence operation is performed by using the predicted-absence-time-period data. However, whether to start the absence operation may be determined using predicted-presence-time-period data.

Specifically, as shown in FIG. 19, when a user is expected to be present around the air conditioner 300, the server 100 causes the air conditioner 300 to perform the absence operation upon determining that nobody is detected for at least a first predetermined time period, using the result of detection from the air conditioner 300, as shown in FIG. 19(*a*). The absence operation ends, and the operation returns to normal mode when a person is detected during the absence operation. When the user is not expected to be present around the air conditioner 300, the server 100 causes the air conditioner 300 to perform the absence operation upon determining that nobody is detected for at least the second predetermined time period, using the result of detection from the air conditioner 300, as shown in FIG. 19(b). Preferably, the second predetermined time period is shorter than the first predetermined time period.

Preferably, in the present embodiment, the CPU 110 calculates the possibility of user presence around the air conditioner 300, in the manner described in Fifth Embodiment. Preferably, the CPU 110 sets a longer first predetermined time period for higher possibilities.

Eighth Embodiment

First to Seventh Embodiments were described through the case of air conditioner 300. It is possible, however, to apply devices other than air conditioner 300. Taking an air purifier as an example, the absence operation may be an operation that increases the strength of air purification at the expense of louder operating noise. As expected, normal mode, in this case, would be a mode in which the air purifier works at less intensity with less operating noise. As another example, in the case of an autonomous vacuum cleaner or a dish washer, the absence operation may be an operation that increases the strength of cleaning or washing at the expense of louder operating noise, and, in normal mode, these devices work at less intensity with less operating noise.

Ninth Embodiment

The roles of the air conditioners 300 of the embodiments above, either in part or as a whole, may be served, for example, by the server 100 or a communication terminal such as a smartphone, or by a remote controller. Alternatively, the roles of the server 100, either in part or as a whole, may be served, for example, by a plurality of servers (100, 200), the air conditioner 300, or a communication terminal such as a smartphone, or by a remote controller. That is, the roles of the servers 100 of First to Eighth Embodiments, either in part or as a whole, may be served by the air conditioner 300 or other devices.

Figure 20:
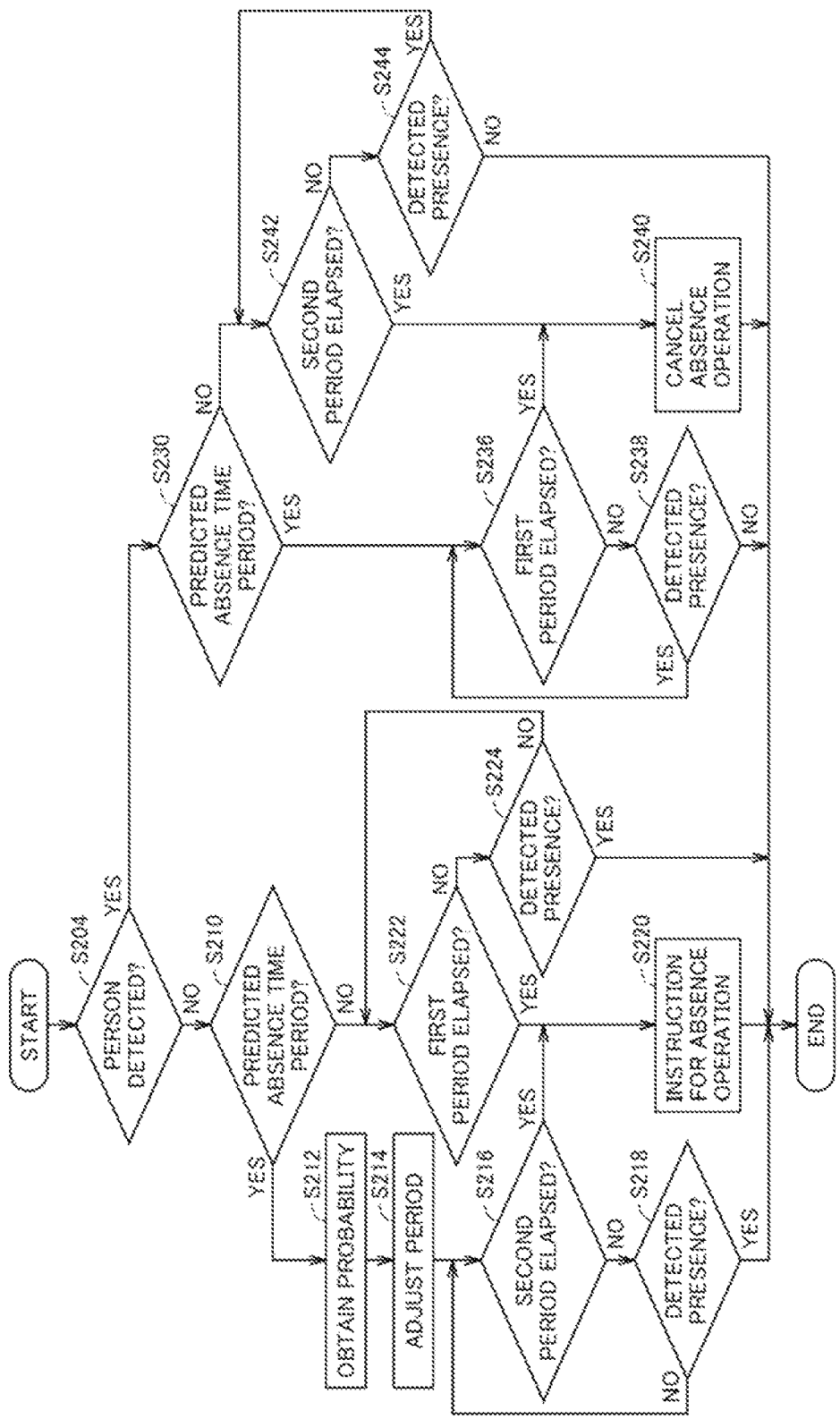
FIG. 20 is a flowchart representing an information process of an air conditioner 300 according to Ninth Embodiment.

In this case, for example, the air conditioner 300 performs the processes represented in FIG. 20. The air conditioner 300 performs the following processes upon obtaining the result of detection by a motion sensor.

The CPU 310 determines whether a person has been detected around the air conditioner 300, using data from the motion sensor 380 (step S204). If nobody has been detected around the air conditioner 300 (NO in step S204), the CPU 310 determines whether a user of the air conditioner 300 is expected to be absent, using the predicted-absence-time-period data of the user corresponding to the air conditioner 300 (step S210).

If the user is expected to be absent (YES in step S210), the CPU 310 calculates the probability of user absence (step S212). The CPU 310 then decides the second predetermined time period, using the probability (step S214).

It is determined whether the second predetermined time period has elapsed from when a person was last detected by the air conditioner 300 (step S216). If it is determined that the second predetermined time period has elapsed (YES in step S216), the CPU 310 performs the process of step S220.

If it is determined that the second predetermined time period has not elapsed (NO in step S216), the CPU 310 determines whether a person has been detected, using data from the motion sensor 380 (step S218). If nobody has been detected (NO in step S218), the CPU 310 repeats the sequence from step S216. If a person has been detected (YES in step S218), the CPU 310 awaits the next data from the motion sensor 380.

If the user is not expected to be absent (NO in step S210), the CPU 310 determines whether a first predetermined time period has elapsed from when a person was last detected (step S222). If it is determined that the first predetermined time period has elapsed (YES in step S222), the CPU 310 performs the process of step S220.

If it is determined that the first predetermined time period has not elapsed (NO in step S222), the CPU 310 determines whether a person has been detected, using data from the motion sensor 380 (step S224). If nobody has been detected (NO in step S224), the CPU 310 repeats the sequence from step S222. If a person has been detected (YES in step S224), the CPU 310 awaits the next data from the motion sensor 380.

If a person has been detected around the air conditioner 300 (YES in step S204), the CPU 310 determines whether the user of the air conditioner 300 is expected to be absent, using the predicted-absence-time-period data (step S230).

If the user is expected to be absent (YES in step S230), the CPU 310 determines whether the first predetermined time period has elapsed from when a person was last detected by the air conditioner 300 (step S236). If it is determined that the first predetermined time period has elapsed (YES in step S236), the CPU 310 performs the process of step S240.

If it is determined that the first predetermined time period has not elapsed (NO in step S236), the CPU 310 determines whether a person has been detected, using data from the motion sensor 380 (step S238). If a person has been detected (YES in step S238), the CPU 310 repeats the sequence from step S236. If nobody has been detected (NO in step S238), the CPU 310 awaits the next data from the motion sensor 380.

If the user is not expected to be absent (NO in step S230), the CPU 310 determines whether the second predetermined time period, shorter than the first predetermined time period, has elapsed from when a person was last detected (step S242). If it is determined that the second predetermined time period has elapsed (YES in step S242), the CPU 310 ends the absence operation (step S240). The CPU 310 then awaits the next data from the motion sensor 380.

If the second predetermined time period has not elapsed (NO in step S242), the CPU 310 determines whether a person has been detected, using data from the motion sensor 380 (step S244). If a person has been detected (YES in step S244), the CPU 310 repeats the sequence from step S242. If nobody has been detected (NO in step S244), the CPU 310 awaits the next data from the motion sensor 380.

Embodiment Summary

The foregoing embodiments provide a network system 1 that includes:
an electric apparatus 300 configured to detect the presence of a person nearby; and
a server 100 that, by using predicted absence data concerning a user of the electric apparatus 300, causes the electric apparatus 300 to perform an absence operation when nobody is detected around the electric apparatus 300 for a first predetermined time period in a period when the user of the electric apparatus 300 is not expected to be absent, and causes the electric apparatus 300 to perform the absence operation when nobody is detected around the electric apparatus 300 for a second predetermined time period, shorter than the first predetermined time period, in a period when the user of the electric apparatus 300 is expected to be absent.

Preferably, the server 100 obtains the probability of predicted absence, and makes the second predetermined time period shorter with increasing probabilities of absence.

Preferably, the server 100 obtains the probability of predicted absence, and makes the first predetermined time period longer with increasing probabilities of presence.

Preferably, the electric apparatus 300 is an air conditioner. The server 100 causes the electric apparatus 300 to perform the absence operation by decreasing the set temperature when the electric apparatus 300 is in heating mode, and by increasing the set temperature when the electric apparatus 300 is in cooling mode.

Preferably, the electric apparatus 300 is an air purifier or a vacuum cleaner. The server 100 causes the electric apparatus 300 to perform the absence operation by increasing the intensity of operation.

Preferably, the second predetermined time period is zero. The server 100 causes the electric apparatus 300 to perform the absence operation when nobody is detected around the electric apparatus 300 in a period when the user of the electric apparatus 300 is expected to be absent.

The foregoing embodiments provide an information processing method that includes the steps of:

an electric apparatus 300 detecting the presence of a person nearby; and a server 100, by using predicted absence data concerning a user of the electric apparatus 300, causing the electric apparatus 300 to perform an absence operation when nobody is detected around the electric apparatus 300 for a first predetermined time period in a period when the user of the electric apparatus 300 is not expected to be absent, and causing the electric apparatus 300 to perform the absence operation when nobody is detected around the electric apparatus 300 for a second predetermined time period, shorter than the first predetermined time period, in a period when the user of the electric apparatus 300 is expected to be absent.

The foregoing embodiments provide a server 100 that includes:

a communication interface 160 for communicating with a plurality of electric apparatuses 300; and a processor 110 that obtains results of detection of a person around each electric apparatus 300 via the communication interface 160, and that, by using predicted absence data concerning a user of the electric apparatus 300, causes the electric apparatus 300 to perform an absence operation when nobody is detected around the electric apparatus 300 for a first predetermined time period in a period when the user of the electric apparatus 300 is not expected to be absent, and causes the electric apparatus 300 to perform the absence operation when nobody is detected around the electric apparatus 300 for a second predetermined time period, shorter than the first predetermined time period, in a period when the user of the electric apparatus 300 is expected to be absent.

The foregoing embodiments provide an information processing method that includes the steps of:

obtaining results of detection detecting the presence of a person around an electric apparatus 300 via a communication interface 160;

causing the electric apparatus 300 to perform an absence operation when nobody is detected around the electric apparatus 300 for a first predetermined time period in a period when a user of the electric apparatus 300 is not expected to be absent, using predicted absence data concerning the user of the electric apparatus 300; and causing the electric apparatus 300 to perform an absence operation when nobody is detected around the electric apparatus 300 for a second predetermined time period, shorter than the first predetermined time period, in a period when a user of the electric apparatus 300 is expected to be absent, using predicted absence data concerning the user of the electric apparatus 300.

The foregoing embodiments provide an electric apparatus 300 that includes:

a communication interface 360 for communicating with a server 100;

a sensor 380 for detecting a person nearby; and a processor 310 that obtains predicted absence data concerning a user via the communication interface 360, and that performs an absence operation when nobody is detected nearby for a first predetermined time period in a period when the user is not expected to be absent, and performs the absence operation when nobody is detected nearby for a second predetermined time period, shorter than the first predetermined time period, in a period when the user is expected to be absent.

OTHER APPLICATION EXAMPLES

As is evident, the present invention also can be achieved by supplying a program to a system or a device. The advantages of the present invention also can be obtained with a computer (or a CPU or an MPU) in a system or a device upon the computer reading and executing the program code stored in the supplied storage medium (or memory) storing software programs intended to realize the present invention.

In this case, the program code itself read from the storage medium realizes the functions of the embodiments above, and the storage medium storing the program code constitutes the present invention.

Evidently, the functions of the embodiments above can be realized not only by a computer reading and executing such program code, but by some or all of the actual processes performed by the OS (operating system) or the like running on a computer under the instructions of the program code.

The functions of the embodiments above also can be realized by some or all of the actual processes performed by the CPU or the like of an expansion board or expansion unit under the instructions of the program code read from a storage medium and written into other storage medium provided in the expansion board inserted into a computer or the expansion unit connected to a computer.

The embodiments disclosed herein are to be considered in all aspects only as illustrative and not restrictive. The scope of the present invention is to be determined by the scope of the appended claims, not by the foregoing descriptions, and the invention is intended to cover all modifications falling within the equivalent meaning and scope of the claims set forth below.

REFERENCE SIGNS LIST

1: Network system
100: Server
110: CPU
120: Memory
121: Outing information 122: Predicted outing information
140: Control
160: Communication interface
200: Server
300: Air conditioner
310: CPU
320: Memory
340: Control
360: Communication interface
370: Speaker
380: Motion sensor
390: Device driving unit

The invention claimed is:

1. A network system comprising:
an electric apparatus; and
a server that computes a predicted absence time period by using prediction data concerning a user of the electric apparatus, and that detects an absence time in which nobody is detected, the server causing the electric apparatus to perform an absence-time operation upon detecting a first absence time in a period outside of the predicted absence time period, and causing the electric apparatus to perform the absence-time operation upon detecting a second absence time, shorter than the first absence time, in a period within the predicted absence time period.

2. The network system according to claim 1, wherein the server makes the second absence time shorter with increasing probabilities of absence.

3. The network system according to claim 1, wherein the server makes the first absence time longer with increasing probabilities of presence.

4. The network system according to claim 1, wherein the electric apparatus is an air conditioner, and performs the absence-time operation by decreasing a set temperature when in heating mode, and by increasing a set temperature when in cooling mode.

5. The network system according to claim 1, wherein the electric apparatus is an air purifier or a vacuum cleaner, and performs the absence-time operation by operating at increased intensity.

6. The network system according to claim 1, wherein:
the second absence time is zero, and
the server causes the electric apparatus to perform the absence-time operation when nobody is detected in the predicted absence time period.

7. A server comprising:
a communication interface for communicating with an electric apparatus; and
a processor that, via the communication interface, computes a predicted absence time period by using prediction data concerning a user of the electric apparatus, and that detects an absence time in which nobody is detected, the processor causing the electric apparatus to perform an absence-time operation upon detecting a first absence time in a period outside of the predicted absence time period, and causing the electric apparatus to perform the absence-time operation upon detecting a second absence time, shorter than the first absence time, in a period within the predicted absence time period.

8. An information processing method for a server, the method comprising the steps of:
computing, via the communication interface, a predicted absence time period by using prediction data concerning a user of an electric apparatus;
detecting an absence time in which nobody is detected;
causing the electric apparatus to perform an absence-time operation when a first absence time is detected in a period outside of the predicted absence time period; and
causing the electric apparatus to perform the absence-time operation when a second absence time, shorter than the first absence time, is detected in a period within the predicted absence time period.

* * * * *